United States Patent [19]
Proctor

[11] 4,003,481
[45] Jan. 18, 1977

[54] BOTTOM UNLOADER FOR A STORAGE CONTAINER
[75] Inventor: Sidney Ernest Proctor, High Wycombe, England
[73] Assignee: Austin Hoy and Company Limited, High Wycombe, England
[22] Filed: Apr. 11, 1975
[21] Appl. No.: 567,431
[30] Foreign Application Priority Data
Apr. 17, 1974 United Kingdom ............ 16866/74
[52] U.S. Cl. .......................................... 214/17 DA
[51] Int. Cl.² ........................................ B65G 65/42
[58] Field of Search ................. 214/17 DA; 222/404
[56] References Cited
UNITED STATES PATENTS

| | | | |
|---|---|---|---|
| 2,675,931 | 4/1954 | Makous | 214/17 DA |
| 3,443,700 | 5/1969 | Cymara | 214/17 DA |
| 3,794,188 | 2/1974 | Denman | 214/17 DA |

Primary Examiner—Robert B. Reeves
Assistant Examiner—John P. Shannon
Attorney, Agent, or Firm—Brady, O'Boyle & Gates

[57] ABSTRACT

A bottom unloader for a storage silo and of the kind having a sweep arm conveyor carrying an endless cutting and conveying chain, the sweep arm being pivoted at or near the silo wall so that it can be swung across the base of the silo and can cut and remove material therefrom, wherein the unloader comprises a pivotal mounting for the sweep arm, a drive assembly for the sweep arm conveyor chain and which is co-axial with the pivotal mounting, and a reciprocating drive assembly for swinging the sweep arm, the reciprocating drive assembly being arranged below the sweep arm and for reception in a radial trough in the base of the silo.

5 Claims, 5 Drawing Figures

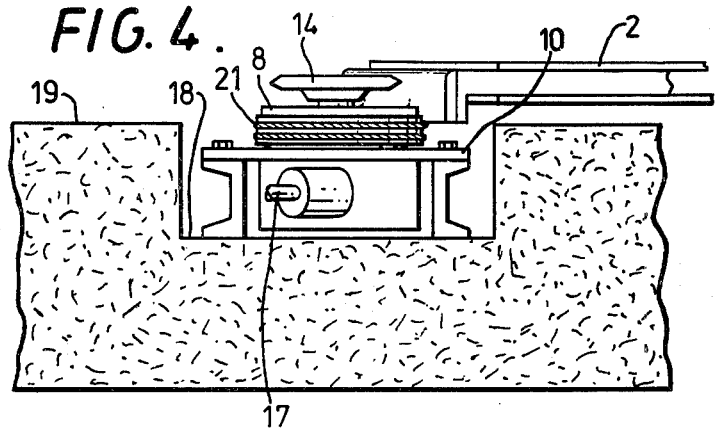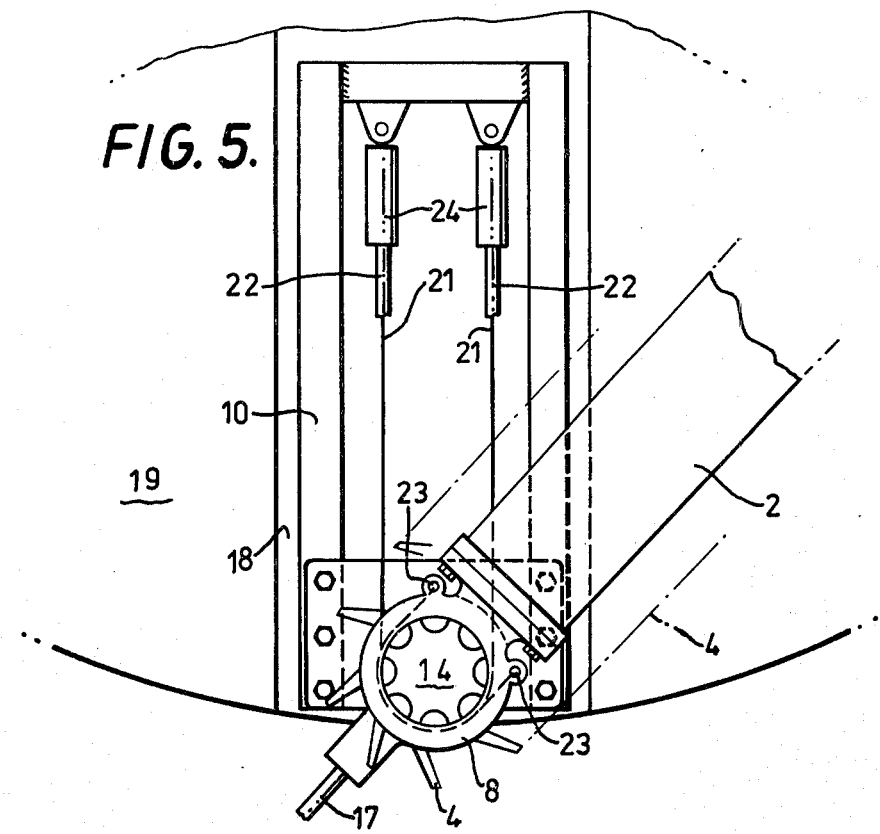

BOTTOM UNLOADER FOR A STORAGE CONTAINER

This invention relates to a bottom unloader for a storage container, e.g. a silo, the unloader being of the kind comprising a sweep arm conveyor pivoted at or near the silo wall and carrying an endless cutting and conveying chain so that the sweep arm conveyor can be swung across the base of the silo and can cut and remove material therefrom. Such an unloader has advantages compared with known unloaders which are pivoted at the centre of a silo since with a centre mounted sweep arm the mechanism is not accessible for maintenance or repair and since it is necessary with such an arrangement to provide additional means for conveying the material from the centre of the silo to a collection position outside the silo wall. Normally this additional conveying means is located in a trough in the base of the silo. A centre mounted sweep arm does however have the advantage that the arm can cover substantially the whole of the floor or area of a cylindrical silo whereas if a wall mounted sweep arm conveyor is to cover the whole of the base of the silo it is necessary to provide pockets in the wall of the silo for accommodating the free end of the sweep arm at the limits of its swinging movement.

It is an object of the invention to provide an unloader of the kind referred to for use in a silo not provided with such pockets, e.g. a silo intended for a centre mounted sweep arm and having in its base a trough for accommodating the additional conveying means.

According to the invention there is provided a bottom unloader of the kind referred to for a storage silo, the unloader comprising a pivotal mounting for the sweep arm, drive means for the sweep arm conveyor chain which is co-axial with the pivotal mounting and means for swinging the sweep arm arranged below the sweep arm and for reception in a radial trough in the base of the silo.

From another aspect the invention is a silo of the kind referred to in combination with a bottom unloader of the kind defined above.

The invention is diagrammatically illustrated by way of example in the accompanying drawings, in which:

FIG. 4 is an end elevation of the bottom unloader, and

FIG. 5 is a plan view of means for swinging the coveyor arm.

Figure 1:
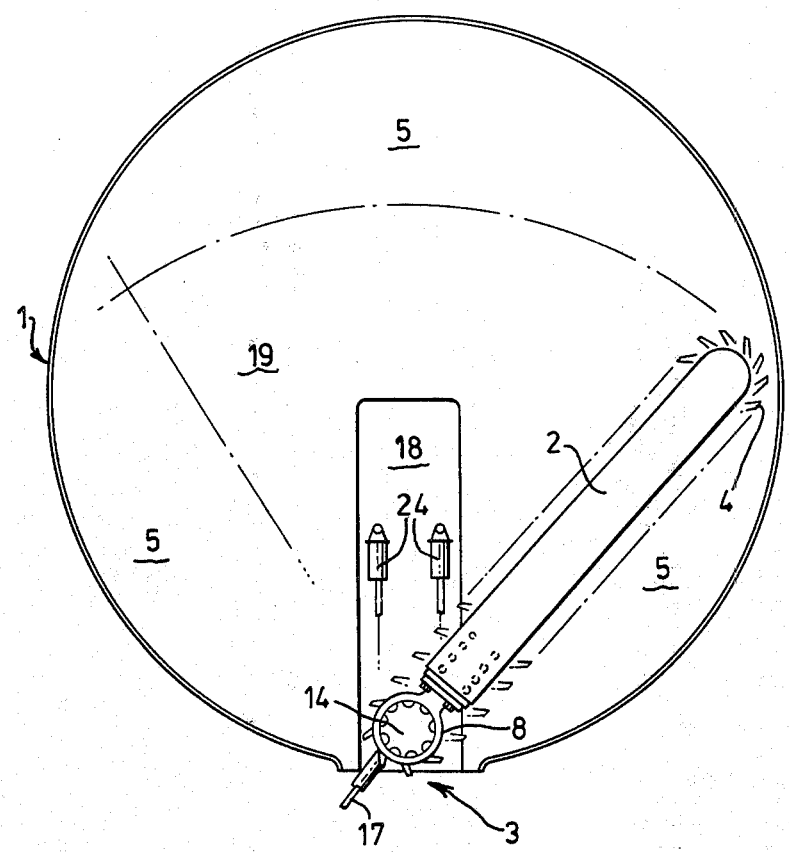
FIG. 1 is a sectional plan view through a storage silo having a bottom unloader therein.
Figure 2:
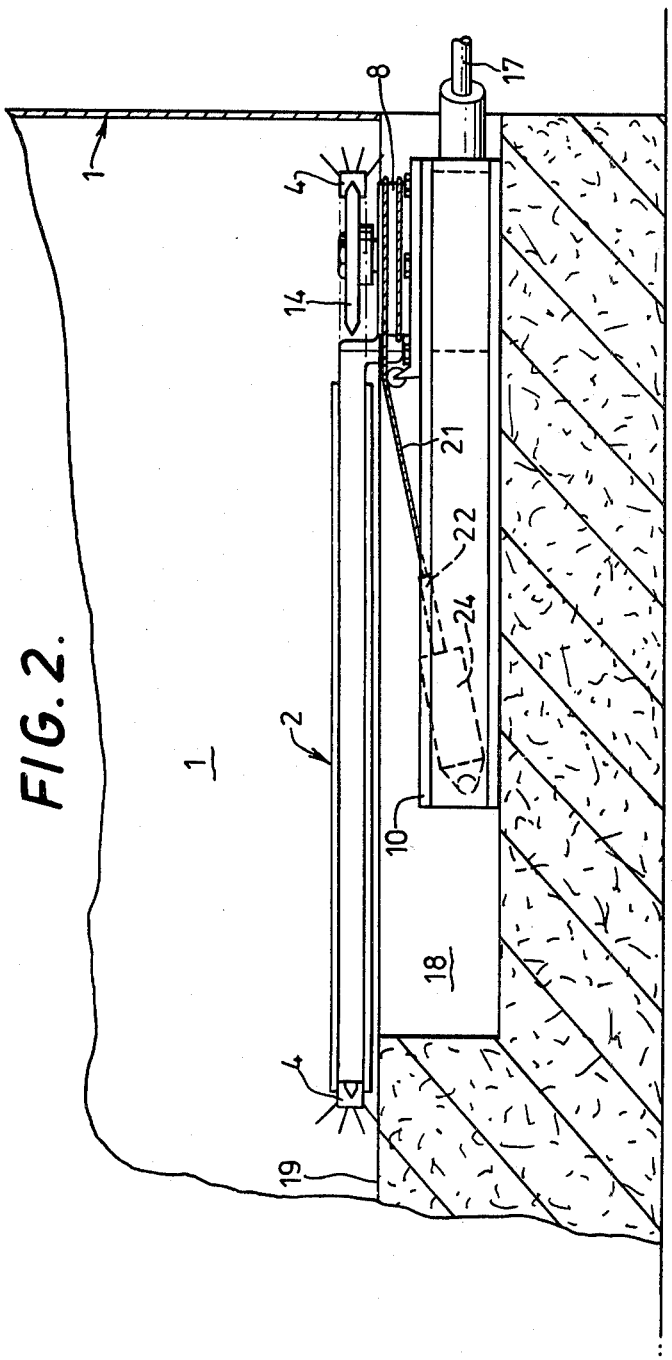
FIG. 2 is a scrap cross-sectional side elevation through the base of the silo of FIG. 1.

In the drawings there is shown a cylindrical storage silo 1 e.g. for forage, in which a bottom unloader is provided having a sweep arm conveyor 2 pivotally mounted at its rearward or discharge end 3 near the silo wall so that the rearward part of a cutter/conveyor chain 4, which runs around the periphery of the sweep arm, is closely adjacent to the periphery of the silo tower. The length of the sweep arm 2 is such that as it sweeps across the floor of the silo it will leave three substantially equal segments 5 of uncut material in the silo. If desired however, the uncut portions of the material may be removed by substituting a longer or shorter sweep arm.

Figure 3:
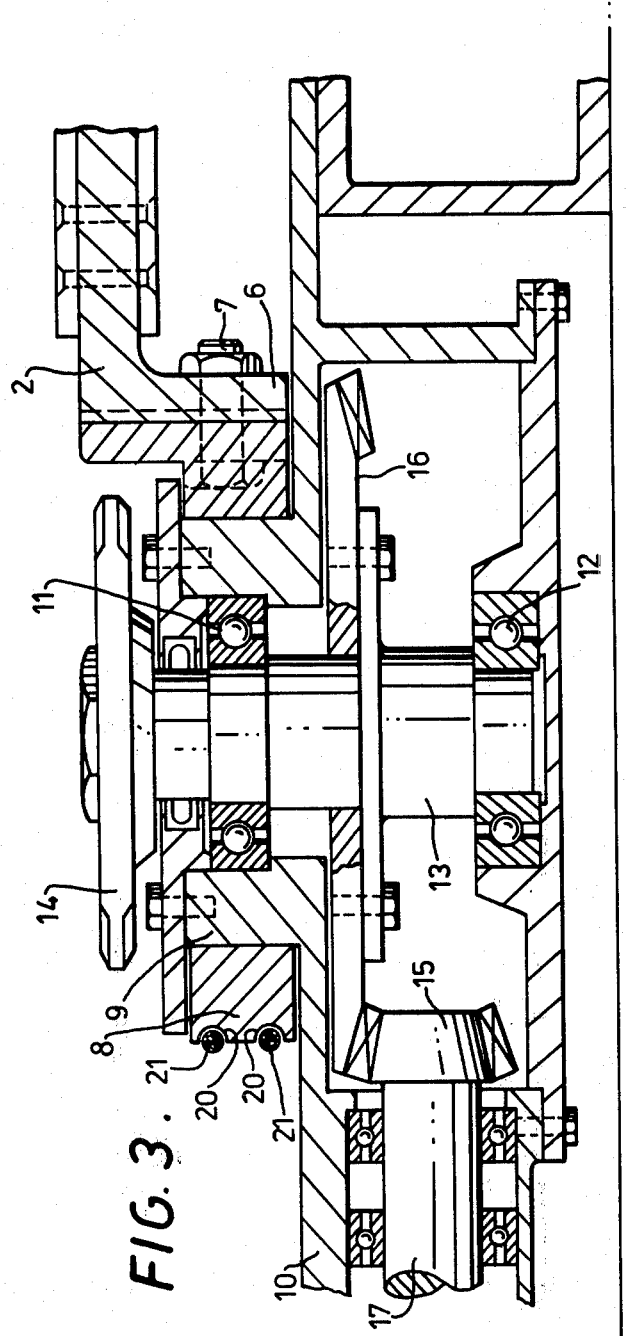
FIG. 3 is a cross-sectional side elevation on an enlarged scale of the pivotal mounting of the sweep arm conveyor of the bottom unloader of FIGS. 1 and 2.

As shown in FIG. 3 the rearward end of the sweep arm 2 is provided with a bracket 6 which has secured thereto by means of bolts 7 a bearing or back-hanger ring 8 which is rotatably received on a spigot 9 which forms part of a frame 10. The spigot 9 is provided internally with a bearing 11 and the frame with a corresponding co-axial bearing 12 which together support a shaft 13 which is co-axial with the bearing ring 8 and which extends through the spigot 9, the shaft 13 carrying at its upper end a drive sprocket 14 around which the cutting and conveying chain 4 of the sweep arm 2 is trained. The shaft 13 carries at its lower end a crown wheel 16 which meshes with a bevel gear provided on a shaft 17 which is also journalled in the frame 10. The shaft 17 may be arranged to be coupled to a suitable prime mover, for example a tractor so that the chain 4 is driven round the arm 2. The frame 10 is arranged to be received in a generally radial channel or trough 18 provided in the silo floor 19, as can be seen in FIG. 4.

The bearing or back hanger ring 8 is provided with a pair of peripheral grooves 20 in each of which is disposed a wire rope 21, the wire ropes being secured to the ring at the positions shown at 23 in FIG. 5 of the drawings. The other ends of the wire ropes 21 are secured to the rods 22 of hydraulic rams 24 which are trunnion mounted within the frame 10 of the unloader, whereby retraction and extension of the rods will cause rotation of the ring 8 on the spigot 9 and thus movement of the arm 2 across the floor of the silo. It will be appreciated that the wire ropes 21 could be replaced by other flexible tension transmitting elements such for example as chains.

Thus the bottom unloader described above has a sweep arm conveyor mounted at the side of the silo and although the mechanism is disposed within the silo tower it is nevertheless easily accessible for maintenance purposes.

I claim:

1. A bottom unloader for a storage silo comprising a sweep arm conveyor carrying an endless cutting and conveying chain, an unloader frame arranged below the sweep arm and for reception in a radial trough in the base of the silo, a pivotal mounting for the sweep arm, the pivotal mounting comprising a bearing ring fixed to the sweep arm and which is rotatably mounted on a spigot provided on the unloader frame, drive means for the sweep arm conveyor chain and which is co-axial with the pivotal mounting, and a pair of fluid actuated rams mounted below the sweep arm on the unloader frame and connected to the bearing ring to cause swinging of the sweep arm about the spigot, whereby the sweep arm can be pivoted adjacent to the silo wall and can be swung across the base of the silo to cut and remove material therefrom.

2. A bottom unloader according to claim 1, wherein the rams are connected to the bearing ring by flexible tension-transmitting means.

3. A bottom unloader according to claim 1, wherein the drive means comprise a drive shaft extending through an aperture in the spigot and journalled in the frame so as to be co-axial with the spigot, the drive shaft carrying a sprocket around which the cutting and conveying chain is trained.

4. A bottom unloader according to claim 3, comprising an input shaft operatively connected to the drive shaft and adapted to be connected to a power source.

5. A storage silo having a base formed with a generally radial trough and comprising a bottom unloader as claimed in claim 1 mounted in the trough.

* * * * *